United States Patent
Cahen

(10) Patent No.: US 9,833,105 B2
(45) Date of Patent: Dec. 5, 2017

(54) BEVERAGE MACHINE WITH A COVER FOR AN INGREDIENT INLET

(75) Inventor: Antoine Cahen, Lausanne (CH)

(73) Assignee: Nestec S.A., Vevey (CH)

(*) Notice: Subject to any disclaimer, the term of this patent is extended or adjusted under 35 U.S.C. 154(b) by 785 days.

(21) Appl. No.: 13/997,904

(22) PCT Filed: Jan. 3, 2012

(86) PCT No.: PCT/EP2012/050031
§ 371 (c)(1),
(2), (4) Date: Jun. 25, 2013

(87) PCT Pub. No.: WO2012/093107
PCT Pub. Date: Jul. 12, 2012

(65) Prior Publication Data
US 2013/0298778 A1    Nov. 14, 2013

(30) Foreign Application Priority Data

Jan. 3, 2011 (EP) .................................. 11150022

(51) Int. Cl.
*A47J 31/06* (2006.01)
*A47J 31/40* (2006.01)
(Continued)

(52) U.S. Cl.
CPC ......... *A47J 31/407* (2013.01); *A47J 31/3676* (2013.01); *A47J 31/4407* (2013.01)

(58) Field of Classification Search
CPC .... B65D 85/8043; A23G 9/045; A47G 19/14; A47J 31/0663; A47J 31/047; A47J 31/3623; A47J 31/3628; A47J 31/3638
(Continued)

(56) References Cited

U.S. PATENT DOCUMENTS 3,880,063 A * 4/1975 Pestka ................. A47J 37/0814
  99/329 R
5,072,662 A * 12/1991 Yip ......................... A47J 37/08
  99/327
(Continued)

FOREIGN PATENT DOCUMENTS

CH   WO 2009115474 A1 *  9/2009  .......... A47J 31/0668
DE        19647039           7/1997
(Continued)

OTHER PUBLICATIONS

Russia Office Action for Application No. 2013136371/12(054654), dated Nov. 18, 2015, 4 pages.
(Continued)

*Primary Examiner* — Dana Ross
*Assistant Examiner* — Joseph Iskra
(74) *Attorney, Agent, or Firm* — K&L Gates LLP

(57) ABSTRACT

A machine (1) for preparing a beverage from at least one ingredient (2) comprises: an ingredient processing module (30); an ingredient passage (40) for inserting an ingredient from outside such machine into the ingredient processing module; and a cover (10) forming a user-handle that is manually movable between a position covering the ingredient passage and a position uncovering the ingredient passage. The cover (10) is manually slidable, in particular translationally slidable, from the covering to the uncovering positions and/or vice versa.

20 Claims, 3 Drawing Sheets

(51) Int. Cl.
*A47J 31/36* (2006.01)
*A47J 31/44* (2006.01)

(58) Field of Classification Search
USPC .......... 99/295, 275, 288, 302 R, 281, 289 R, 99/302 P
See application file for complete search history.

(56) References Cited

U.S. PATENT DOCUMENTS

| | | | |
|---|---|---|---|
| 5,657,683 A | 8/1997 | Sandei et al. | |
| 6,325,312 B1* | 12/2001 | Karkos, Jr. | A23G 9/045 241/100 |
| 6,752,287 B1 | 6/2004 | Lin | |
| 6,835,915 B2* | 12/2004 | Timm | A47J 31/005 219/429 |
| 7,503,253 B2 | 3/2009 | Rahn | |
| 2004/0231521 A1* | 11/2004 | Yoakim | A47J 31/0678 99/275 |
| 2004/0237793 A1* | 12/2004 | Zurcher | A47J 31/3642 99/275 |
| 2008/0134902 A1* | 6/2008 | Zimmerman | A47J 31/32 99/302 R |
| 2010/0229731 A1 | 9/2010 | De' Longhi | |
| 2010/0288132 A1* | 11/2010 | Gavillet | A47J 31/3628 99/295 |
| 2010/0300299 A1* | 12/2010 | Epars | A47J 31/3623 99/288 |

FOREIGN PATENT DOCUMENTS

| | | |
|---|---|---|
| EP | 1859714 | 11/2007 |
| JP | 2005110835 | 4/2005 |
| JP | 3802834 | 7/2006 |
| JP | 2007062462 | 3/2007 |
| JP | 2008119971 | 1/2008 |
| JP | 4278706 | 6/2009 |
| JP | 2009151957 | 7/2009 |
| WO | 02074144 | 9/2002 |
| WO | 2009077488 | 6/2009 |
| WO | 2009115474 | 9/2009 |
| WO | 2009141364 | 11/2009 |
| WO | 2010032271 | 3/2010 |
| WO | 2010081762 | 7/2010 |

OTHER PUBLICATIONS

Japanese Office Action for Application No. P2013-546730, Dispatch No. 477393, dated Oct. 27, 2015, 8 pages.
Japanese Office Action for Application No. P2013-546730, Dispatch No. 143649, dated Mar. 29, 2016, 7 pages.
Russian Office Action for Application No. 2013136371/12(054654), dated Jul. 8, 2016, 4 pages.

\* cited by examiner

BEVERAGE MACHINE WITH A COVER FOR AN INGREDIENT INLET

CROSS REFERENCE TO RELATED APPLICATIONS

The present application is a National Stage of International Application No. PCT/EP2012/050031, filed on Jan. 3, 2012, which claims priority to European Patent Application No. 11150022.9, filed Jan. 3, 2011, the entire contents of which are being incorporated herein by reference.

FIELD OF THE INVENTION

The field of the invention pertains to beverage preparation machines, in particular using capsules of an ingredient of the beverage to be prepared, such as beverage preparation machines having a passage for inserting a beverage ingredient into the machine, in particular an ingredient supplied in the form of a preportioned ingredient capsule, and a member for covering and uncovering the passage, as desirable during normal use of the machine.

For the purpose of the present description, a "beverage" is meant to include any human-consumable liquid substance, such as tea, coffee, hot or cold chocolate, milk, soup, baby food, etc. . . . A "capsule" is meant to include any preportioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule.

The actuation of the movable part of the brewing device may be motorized. Such a system is for example disclosed in EP 1 767 129. In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent injuries by squeezing.

The actuation of the movable part of the brewing device may be manual. WO 2009/043630 discloses a beverage preparation machine including a brewing unit having a front part with a passage for inserting a capsule into the brewing unit. The front part is arranged to telescope out of the machine's housing for uncovering the passage for inserting a capsule into the brewing unit and telescopes into the brewing unit for sliding the passage under the housing and thus covering the passage by the housing. A pivotable arched handle is configured for driving the front part manually.

WO 2005/004683 and WO 2007/135136 disclose a device comprising a frame, a fixed holding part for the capsule, a movable holding part which is mounted relative to the frame in a sliding relationship, one or two knuckle joint mechanisms that provide a mechanical system which enables to close in a steady and fluid-tight manner the holding parts about the capsule while also resisting to the counter-force acting while re-opening and generated by the internal brewing pressure, and a handle for directly levering the knuckle joint mechanism. Such a device forms a simple assembly enabling insertion of the capsule by vertical fall through a passage in the frame and removal of the used capsule in the same direction as the insertion direction. The handle is in the form of a lever that is manually pivotable about an end thereof adjacent the machine's housing. In the closed position, the handle is pivoted down against the machine's housing and over the capsule inlet passage to cover it. In the open position, the handle is pivoted up away from the capsule inlet passage to uncover this passage. Hence, in addition to moving the holding part, the handle serves to cover and uncover the passage for the capsule. The manual force required to move the movable parts varies during closure and opening of the machine and depends on the dimensional tolerances of the capsules used, the positioning of the capsule and the temperature of the brewing unit.

SUMMARY OF THE INVENTION

The invention relates to a machine for preparing a beverage from at least one ingredient and dispensing such prepared beverage. For instance, the machine is a coffee, tea, chocolate, cacao, milk or soup preparation machine. In particular, the machine is arranged for preparing within a beverage processing module a beverage by passing hot or cold water or another liquid through a capsule containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 200 ml, e.g. the volume for filling a cup or mug, depending on the type of beverage. Formed and dispensed beverages may be selected from ristrettos, espressos, lungos, cappuccinos, café latte, americano coffees, teas, etc. . . . In particular, a coffee machine may be configured for dispensing espressos, e.g. an adjustable volume of 20 to 60 ml per serving, and/or for dispensing lungos, e.g. a volume in the range of 70 to 150 ml per serving.

In particular, the machine comprises: an ingredient processing module; an ingredient passage for inserting an ingredient from outside such machine into the ingredient processing module; and a cover forming a user-handle that is manually movable between a position covering the ingredient passage and a position uncovering the ingredient passage.

The ingredient processing module may include a first part and a second part movable relative to the first part from a position for housing therein the ingredient to a transfer position for inserting the ingredient into the processing module and/or for evacuation thereof from the processing module.

Typically, the beverage preparation machine comprises a stationary structure, such as a housing and/or a frame.

The structure may be arranged to rest on a support surface such as a table. The ingredient passage may be stationary relative to the structure. The cover of the invention may be movable relative to the structure between the covering and uncovering positions.

The second part of the processing module can be made movable relative to the first part and relative to the stationary structure. The first part may be stationary relative to the structure or movable thereto.

The second part can be arranged to move in a direction, in particular an arched and/or linear direction. Typically, the first and second parts in their processing position delimit a cavity for housing the beverage ingredient, such as tea or coffee or chocolate or powder milk. The ingredient processing module may include an upstream fluid circuit for delivering a carrier liquid, such as water, into the cavity and a downstream fluid circuit having a beverage outlet for delivering from the cavity the beverage formed by the carrier liquid flavoured by the beverage (flavouring) ingredient, the ingredient being in particular inserted into the cavity within a capsule.

As discussed above, the ingredient is optionally inserted into the processing module and/or evacuated therefrom within an ingredient capsule, e.g. an aluminium or plastic or paper enclosure containing the ingredient.

The ingredient passage can be generally upright so that the ingredient, optionally contained within a capsule, is movable in the passage under the effect of gravity. The passage may comprise an insertion portion guiding the ingredient into the processing module and an evacuation portion guiding the ingredient from the processing module. The cover is normally associated with the insertion portion.

In accordance with the invention, the cover is manually slidable, in particular translationally slidable, from the covering to the uncovering positions and/or vice versa.

As opposed to prior art covering handles, e.g. as disclosed in WO 2007/135136, which are pivotable between a position extending along the machine housing to cover the ingredient passage and a position angled away therefrom to uncover the ingredient passage, the machine of the present invention does not need a significant volume of free space adjacent the machine's housing to pivot the cover, since the cover of the present invention is slidable between the covering position and the uncovering position.

The cover may be a generally plate-like slide, planar or arched movable to close and open the ingredient passage. The cover may closely follow the outer shape and boundaries of the machine between the covering and uncovering positions without noticeable increase of the overall space occupation of the machine between the covering and uncovering positions of the cover.

The cover has a shape that allows a user, e.g. via the hand or one or more fingers, to manually seize it or push it for moving it between the covering and the uncovering position during normal use. For example the cover has a portion with a surface structure or composition, in particular an anti-skid surface that provides friction against a human hand to reduce the necessary gripping force needed to achieve a reliable user-control of the cover.

Typically, the machine has an outer housing, the passage extending from a face of the housing to the ingredient processing module and the cover being slidable in parallel along the housing face, in particular outside the outer housing. The housing face may have an arrangement for guiding the cover between the covering and the uncovering positions. The guiding arrangement can include a guiding recess and/or a guiding rail extending from the passage or from adjacent thereto. The housing face may form or delimit a top machine face and/or a generally horizontally extending machine face.

In one embodiment, the cover is associated with an automatic return device for driving the cover into a stable position, in particular into the covering position and/or into the uncovering position. The automatic return device may be a bistable device for driving the cover into two different positions, in particular into the covering position and into the uncovering position.

The ingredient processing module may have a processing configuration for processing the ingredient and an ingredient transfer configuration for inserting the ingredient into the processing module and/or removing the ingredient therefrom. The cover can be prevented from being moved into the uncovering position when the ingredient processing module is processing the ingredient, optionally the cover being locked in the covering position or movable into an intermediate position for manually interrupting processing of the ingredient in the module.

The machine typically includes a control unit, in particular a unit for controlling the ingredient processing module. The cover may form or be part of a user-interface in data communication with the control unit, optionally the cover comprising or being associated with a sensor connected to the control unit for sensing a position of the cover such as a sensor selected from an electro-mechanical switch sensor, a magnetic sensor, an electromagnetic sensor and an optical sensor. The control unit may comprise a power management module arranged to power the control unit and optionally further electric components, such as a user-interface and/or a thermal conditioner in particular a heater, when the control unit is unpowered or in standby state and the cover moved, in particular into the uncovering position.

The machine can comprise a motor for driving the processing module: from a configuration for processing the ingredient; to an ingredient transfer configuration for inserting said ingredient into the processing module and/or removing said ingredient therefrom; and/or vice versa. The motor may be arranged to drive the processing module into: the processing configuration when the cover is moved into the covering position; and/or the transfer configuration when the cover is moved into the uncovering position.

The machine may have a control unit for controlling the ingredient processing module, the control unit being arranged to initiate automatically beverage preparation when the ingredient is inserted into the processing module and the cover is moved into the covering position. Insertion of the ingredient into the module may be detected by any system, e.g. as known in the art such as an optical detection.

The ingredient processing module can be configured to circulate automatically a mixing and/or infusion liquid to the ingredient when the first and second parts reach the processing position, e.g. the position for housing the ingredient in the processing module.

The machine may have a control unit that is arranged to initiate automatically a shut-down or standby process and/or a service process, when no ingredient is inserted in the processing module and the cover is moved into the covering position. Likewise, the absence of insertion of the ingredient into the module may be detected by any suitable system, e.g. as mentioned above.

Hence, a beverage machine with a simple and space-saving user-handled element, e.g. slider or sliding cover, can be provided to:
   open and close access to the capsule insertion area;
   act as an electronic switch to control the operation of the machine; and/or
   prevent undersirable user operations, e.g. open the ingredient processing unit in the course of processing.

The slider is in the closed position when machine is turned off or when ingredient processing, e.g. brewing, is in course.

For example, depending on the machine status the movement of the slider by the user can have different effects:
   When the machine is turned off, the user bringing the cover towards the uncovering position can start-up the machine and allow insertion of the ingredient.
   When the machine is processing the ingredient, the user moving the cover from the covering position will interrupt the ingredient processing and then drive the processing module into the transfer configuration, optionally, the slider may be locked in an intermediate position between processing interruption and reaching the transfer configuration so that a new ingredient can be inserted into the passage only once the processing module is ready to receive such an ingredient.

The cover can be in the uncovering position when the machine is already turned on, after the user has uncovered the ingredient passage the slider:
   Upon the end of processing an ingredient and dispensing a beverage or simply after having turned on the machine.
   In the open position the user may introduce a new ingredient in the processing module. Thereafter, when the user brings the cover into the covering position, the processing module may be automatically driven into the processing configuration. Ingredient processing may start as soon as the processing module has reached the processing configuration. If needed, the ingredient processing may be delayed until a start-up process is completed, e.g. at the end of a shut-on process or standby exit process.
   When the user brings the cover into the covering position without having inserted an ingredient into the passage, a service program may be initiated or a shutdown or standby process may be initiated.

BRIEF DESCRIPTION OF THE DRAWINGS

The invention will now be described with reference to the schematic drawings, wherein.

DETAILED DESCRIPTION

FIGS. 1 to 3b illustrate parts of an exemplary embodiment of a machine 1 for preparing a beverage from at least one ingredient 2 in accordance with the invention.

The ingredient may be supplied in the form of an ingredient capsule 2, e.g. of the type described above under the header "field of the invention".

Figure 1:
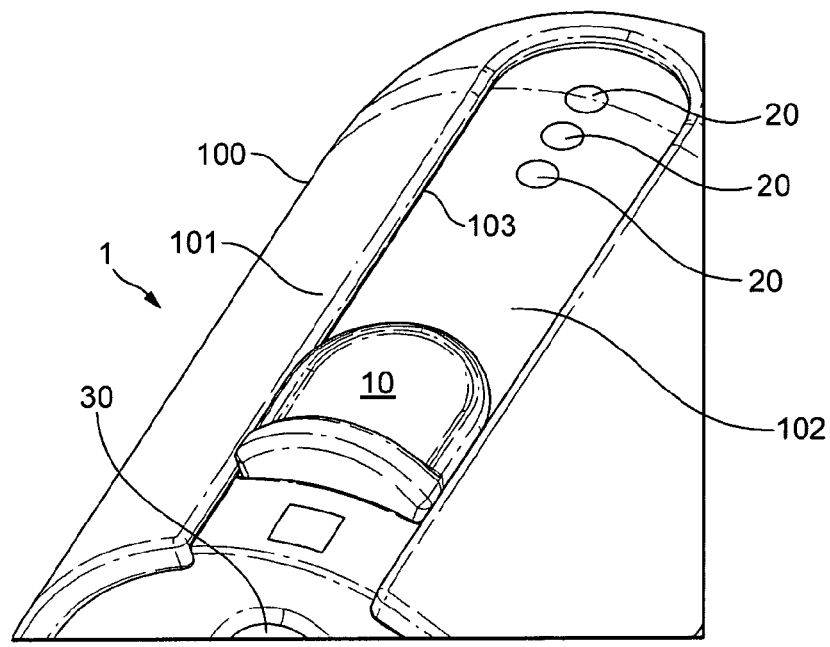
FIGS. 1 and 2 show part of a machine according to invention having a cover arranged to cover and uncover an ingredient passage.
Figure 2:
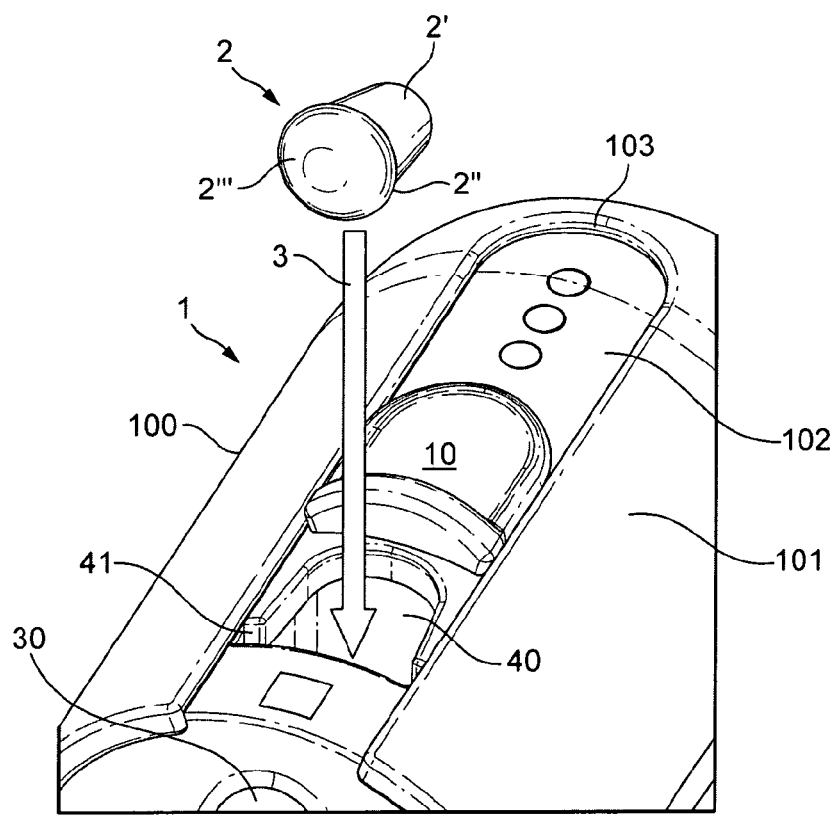

Machine 1 comprises an ingredient processing module 30; an ingredient passage 40 for inserting ingredient 2 from outside such machine 1 into ingredient processing module 30; and a cover 10 forming a user-handle that is manually movable between a position covering ingredient passage 40 (FIG. 1) and a position uncovering ingredient passage 40 (FIG. 2).

The ingredient processing module may have an outlet for dispensing beverage prepared in the ingredient processing module. The module can have an ingredient cavity for receiving ingredient 2 supplied into machine 1 via passage 40 and may be configured to circulate automatically the liquid into the cavity containing ingredient 2, optionally within a capsule.

The cavity may be configured for holding and housing a flavouring ingredient, such as tea or coffee or chocolate or powder milk. As mentioned above, the ingredient may be inserted pre-portioned within a capsule 2 into this cavity.

A flavoured beverage may be prepared by circulating a carrier liquid, such as water, into the ingredient cavity to flavour the liquid by exposure to the flavouring ingredient held in the cavity.

The ingredient cavity may be delimited by first and second parts that are relatively movable between a processing configuration for housing therein said ingredient and a transfer configuration for inserting said ingredient into the processing module and/or for evacuation thereof from the processing module. An automatic ingredient recognition system may be used to parameterize and adjust the processing of the ingredient automatically in line with the type of ingredient.

When closed capsules 2 of flavouring ingredients are used, first and second parts delimiting the ingredient cavity may include a capsule opener such as blades and/or a tearing tool, e.g. a plate with a tearing profile, for instance as known form Nespresso™ machines.

Beverage machine 1 typically includes one or more of the following components:
   a) Processing module 30, e.g. a fluid circuit including a brewing unit, delimiting in the processing position an inner flavouring chamber for receiving and housing an ingredient of the beverage such as a flavouring ingredient, in particular a pre-portioned ingredient supplied within capsule 2, and for guiding via an inlet an incoming flow of liquid for flavouring thereof, such as water, through this ingredient to beverage outlet;
   b) an in-line heater for heating this flow of liquid to be supplied to ingredient 2;
   c) a pump for pumping liquid through the in-line heater;
   d) one or more fluid connecting members for guiding liquid from a source of liquid, such as tank of liquid;
   e) an electric control unit, in particular comprising a printed circuit board (PCB), for receiving instructions from a user via an input user-interface and for controlling the in-line heater and the pump; and/or
   f) one or more sensors for sensing at least one characteristic selected from characteristics of the processing module, the in-line heater, the pump, the liquid tank, an ingredient collector, a flow of the liquid (e.g. by a flowmeter), a pressure of the liquid and a temperature of the liquid, and for communicating such characteristic(s) to the control unit.

In particular, the ingredient processing module includes or is connected to an upstream fluid arrangement, e.g. incorporating a liquid driver, such as a pump, and a thermal conditioner, such as a heater, for circulating thermally conditioned liquid, such as water, from a source, e.g. a liquid reservoir, into the ingredient processing cavity. Examples of upstream fluid arrangements are disclosed in WO 2009/074550 and in WO 2009/130099. The heater may be a thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable fluid circuits of beverage preparation modules are for instance disclosed in WO 2009/074550 and WO 2009/130099, which are hereby incorporated by way of reference.

Moreover, ingredient processing module 30 comprises a downstream fluid arrangement with an outlet for dispensing beverage to a user, e.g. to an area for placing a user-cup or a user-mug, the beverage formed in the ingredient cavity containing the ingredient mixed with the circulating liquid. The dispensing area may be delimited at the bottom by a support surface for holding a user cup or mug. Such support surfaces are well known in the art, e.g. as disclosed in EP 1 867 260 and WO 2009/074557.

In accordance with the invention, cover 10 is manually slidable, in particular translationally slidable, from the covering (FIG. 1) to the uncovering (FIG. 2) positions and/or vice versa.

Machine 1 may have an outer housing 100. Passage 40 may extend from a face 101 of housing 100 to the ingredient processing module 30. In particular, cover 10 is slidable in parallel along housing face 101, in particular outside outer housing 100.

Ingredient capsule 2 may have a generally cup-shaped body 2' with a rim 2" to which a lid 2''' is sealed for enclosing the ingredient. Passage 40 may have a shape that generally fits the shape of capsule 2 or a part thereof. In particular, passage 40 has a pair of facing guide portions 41 that fit and guide rim 2" of capsule 2 when inserted into passage 40 as indicated by arrow 3 in FIG. 2. The interaction between a brewing unit (or another kind of processing module) and the flavouring ingredient, when provided within a capsule, may be of the type disclosed in EP 1 859 714 or in EP 2 205 133.

Housing face 101 may have an arrangement 102,103 for guiding cover 10 between the covering position (FIG. 1) and the uncovering position (FIG. 2). The guiding arrangement can comprise a guiding recess 102 and/or one or more guiding rail 103 extending from the passage 40 or from adjacent thereto. Guiding rails 103 may cooperate with support members 11 of cover 10. Support members 11 may be generally u-shaped in cross-section to fit a corresponding shape of guiding rails 103 and secure cover 10 to housing face 101, in particular in guiding recess 102. The shapes of cover 10, supports 11, recess 102 and rails 103 are such as to allow cover 10 to slide between the covering position (FIG. 1) and the uncovering position (FIG. 2), from above passage 40 for covering it to the side of it for uncovering it, and/or vice versa.

Typically, housing face 101 forms or delimits a top machine face and/or a generally horizontally extending machine face. Hence, ingredient 2 may be inserted into machine 1 from above passage 40, as indicated by arrow 3 in FIG. 2.

Figure 3:
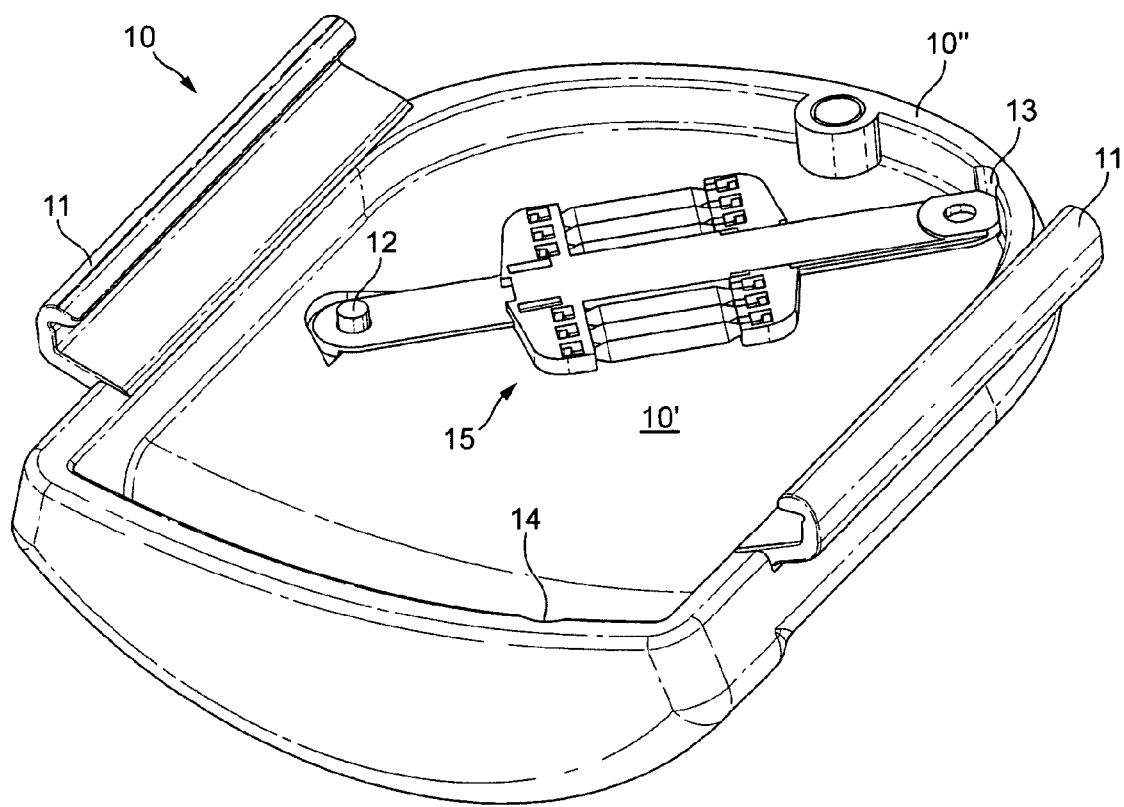
FIG. 3 illustrates a perspective view from below of such a cover associated to a bistable automatic return device.
Figure 3A:
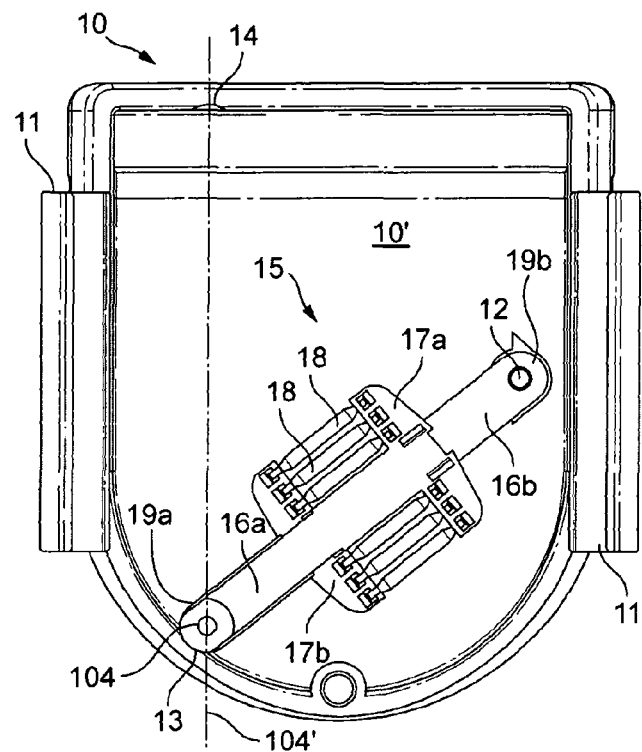
FIGS. 3a and 3b illustrate the bistable automatic return device in a first stable position and in a second stable position, respectively.
Figure 3B:
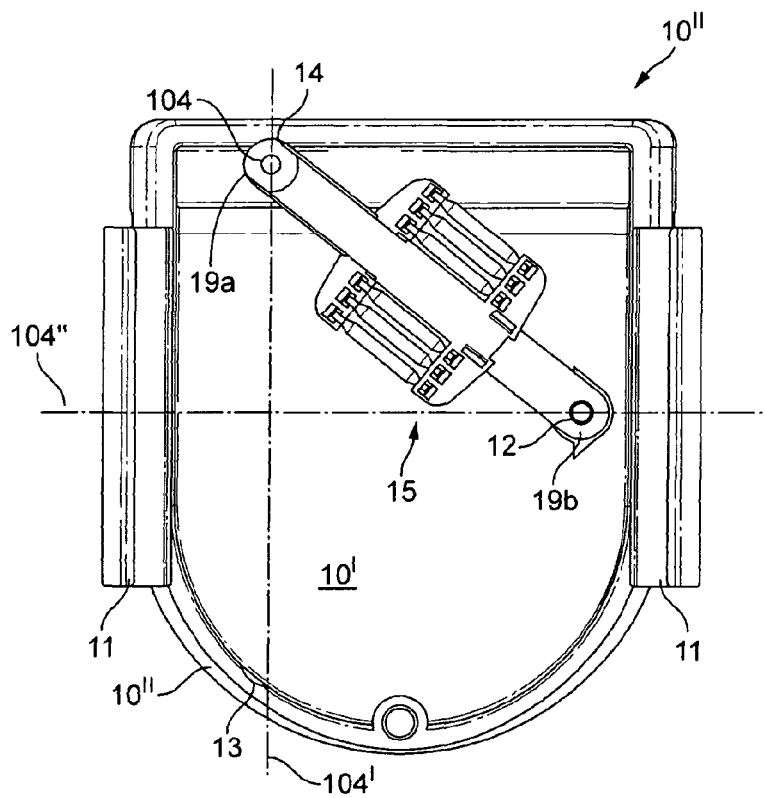

As illustrated in the exemplary embodiment shown in FIGS. 3 to 3b, cover 10 can be associated with an automatic return device 15 for driving cover 10 into a stable position, in particular into the covering position and/or into the uncovering position. Automatic return device can be a bistable device 15 for driving cover 10 into two different stable positions, in particular into the covering position (FIGS. 1 and 3a) and into the uncovering position (FIGS. 2 and 3b).

Automatic return device 15 may comprise an elastic arrangement, e.g. a spring arrangement 18 such as compression and/or traction springs, that relaxes by reaching the stable position(s).

In a particular, automatic return device 15 may be connected directly or indirectly to passage 40, in particular via housing face 101, and/or to cover 10. For instance, device 15 is located within a cavity 10' of cover 10 facing housing face 101. For example, automatic return device 15 has a first end 19a pivotally mounted on an axis 104 fixed to housing face 101 and a second end 19b pivotally mounted on an axis 12 fixed to cover 10. Device 15 may include a pair of relatively movably arms 16a,16b connected to one another inbetween their ends 19a,19b. Members 16a,16b may each be fixed to a spring support 17a,17b. Member 16a,16b and support 17a,17b can be shaped generally as a "T" element. Spring supports 17a,17b are interconnected by spring arrangement 18. For example, T-element 16a,17a and T-element 16b,17b are mounted in opposition along their members 16a,16b so that the forces generated by springs 18 urges their ends 19a,19b apart. In particular spring arrangement 18 comprises one or more traction springs connecting spring supports 17a,17b.

When cover 10 is moved from the covering position (FIG. 1) to the uncovering position (FIG. 2), end 19a pivots around axis 104 fixed to housing face 101 and end 19b pivots around axis 12 fixed to cover 10. Cover 10 slides over end 19a and axis 104 so that end 19a follows cover 10 along dashed line 104' from first stable end position 13 to second stable end position 14. End positions 13,14 are delimited by recesses in sidewall 10" to form corresponding seats for receiving end 19a.

When device 15 is pivoting adjacent cover 10, e.g. within cavity 10', along dashed line 104', ends 19a,19b are driven towards each other when leaving end positions 13,14 up to median line 104" and driven apart once device 15 has passed line 104" and moves towards either end position 13,14. When ends 19a,19b are driven towards each other, support members 17a,17b are driven apart and spring arrangement 18 is stressed. When ends 19a,19b are driven apart, support member 17a,17b are driven towards each other and spring arrangement 18 relaxes. Hence, spring arrangement 18 forces ends 19a and 19b apart into a stable positions 13,14 shown in FIGS. 3a,3b. In the particular embodiment shown in these Figures, spring arrangement 18 operates in traction. It is of course possible to modify device 15 so that arrangement 18 operates in compression or angularly, e.g. with one or more spiral springs.

It follows that device 15 drives or assists displacement of cover 10 from an intermediate position into stable positions on either side of the intermediate position, in particular into the covering position (FIG. 1) and the uncovering position (FIG. 2). Furthermore, device 15 may prevent improper positioning of cover 10 by driving cover 10 automatically into stable positions. Hence, the ergonomics linked to cover 10 are improved.

In an embodiment, ingredient processing module 30 has a processing configuration (FIG. 1) for processing ingredient 2 and an ingredient transfer configuration (FIG. 2) for inserting said ingredient into the processing module and/or removing said ingredient therefrom. Cover 10 is prevented from being moved into the uncovering position when the ingredient processing module 30 is processing ingredient 2, optionally the cover being locked in the covering position or movable into an intermediate position for manually interrupting processing of said ingredient. The locking of cover 10 may be achieved by a stopper, e.g. extending through housing face 101 and intercepting sidewall 10" of cover 10, typically underneath cover 10, to prevent passage of cover 10 beyond a certain point. The locking may be provided in the covering position or in an intermediate position.

Normally, machine has a control unit, in particular a unit for controlling the ingredient processing module, as known in the art. Cover 10 may form or be part of a user-interface in data communication with the control unit. The user-interface may include one or more interface devices 20, such as user-input devices, e.g. buttons, and/or output devices, e.g. LEDs. Optionally, cover 10 comprises or is associated with a sensor connected to the control unit for sensing a position of cover 10 such as a sensor selected from an electro-mechanical switch sensor, a magnetic sensor, an electromagnetic sensor and an optical sensor. For example, the abovementioned stopper is combined with an electric switch that is operated by urging cover 10 against the stopper.

Such a control unit may comprise a power management module arranged to power the control unit and optionally further electric components, such as a user-interface and/or a thermal conditioner in particular a heater, when the control unit is unpowered or in standby state and the cover moved, in particular into the uncovering position.

In a particular embodiment, machine 1 has a motor for driving the processing module 30: from a configuration for processing ingredient 2; to an ingredient transfer configuration for inserting ingredient 2 into the processing module and/or removing ingredient 2 therefrom; and/or vice versa.

The motor can be arranged to drive the processing module 30 into:
 the processing configuration when cover 10 is moved into the covering position; and/or
 the transfer configuration when cover 10 is moved into the uncovering position.

Machine 1 may have a control unit for controlling ingredient processing module 30. The control unit can be arranged to initiate automatically beverage preparation when ingredient 2 is inserted into the processing module 30 and the cover 10 is moved into the covering position. The control unit can be arranged to initiate automatically a shut-down or standby process and/or a service process, when no ingredient 2 is inserted in the processing module 30 and the cover 10 is moved into the covering position.

Machine 1 may have a collector receptacle (not shown) for collecting used ingredients, such as tea leaves or ground coffee, e.g. within used capsules, and waste liquid. Collector receptacle may be insertable, e.g. slidable, into a cavity formed in machine 1 and removable therefrom for servicing, e.g. emptying the solids and/or liquids contained therein.

Further details of such a machine, in particular relating to the processing unit, beverage outlet, control unit and the motorization are for example disclosed in EP 1 767 129 and EP 10 193 234, which are hereby incorporated by way of reference.

The invention claimed is:

1. A machine for preparing a beverage from at least one ingredient comprising:
 an ingredient processing module;
 an ingredient passage for inserting an ingredient from outside the machine into the ingredient processing module;
 a cover forming a user-handle that is manually movable in a linear direction between (1) a position covering the ingredient passage, wherein the cover forming the user-handle closes access to the ingredient passage, and (2) a position uncovering the ingredient passage, and the cover is manually slidable from the covering position to the uncovering position and/or vice versa.

2. The machine of claim 1, which has an outer housing and wherein the passage extends from a face of the housing to the ingredient processing module, the cover being slidable in parallel along the housing face.

3. The machine of claim 2, wherein the housing face has an arrangement for guiding the cover between the covering and the uncovering positions.

4. The machine of claim 3, wherein the guiding arrangement comprises a guiding recess and/or a guiding rail extending from the passage or from adjacent the passage.

5. The machine of claim 2, wherein the housing face defines a top machine face and/or a generally horizontally extending machine face.

6. The machine of claim 1, wherein the cover is associated with an automatic return device for driving the cover from an intermediate position into a stable position selected from the group consisting of the covering position and the uncovering position.

7. The machine of claim 6, wherein the automatic return device is a bistable device for driving the cover into two different positions.

8. The machine of claim 1, wherein the ingredient processing module has a processing configuration for processing the ingredient and an ingredient transfer configuration for inserting the ingredient into the processing module and/or removing said ingredient therefrom.

9. The machine of claim 8, wherein the cover is prevented from being moved into the uncovering position when the ingredient processing module is processing the ingredient.

10. The machine of claim 1, having a control unit, and the cover forms or is part of a user-interface in data communication with the control unit.

11. The machine of claim 10, wherein the control unit comprises a power management module arranged to power the control unit.

12. The machine of claim 1, comprising a motor for driving the processing module from a configuration for processing the ingredient; to an ingredient transfer configuration for inserting the ingredient into the processing module and/or removing said ingredient therefrom; and/or vice versa.

13. The machine of claim 12, wherein the motor is arranged to drive the processing module into a configuration selected from the group consisting of:
 a processing configuration when the cover is moved into the covering position; and
 a transfer configuration when the cover is moved into the uncovering position.

14. The machine of claim 1, having a control unit for controlling the ingredient processing module and the control unit is arranged to initiate automatically beverage preparation when the ingredient is inserted into the processing module and the cover is moved into the covering position.

15. The machine of claim 1, having a control unit that is arranged to initiate automatically a shut-down or standby process and/or a service process, when no ingredient is inserted in the processing module and the cover is moved into the covering position.

16. The machine of claim 1 comprising a stationary outer housing, wherein the covering and uncovering positions of the cover are different positions of the cover relative to the outer housing.

17. A machine for preparing a beverage from at least one ingredient, the machine comprising:
   an ingredient processing module;
   an ingredient passage for inserting an ingredient from outside the machine into the ingredient processing module; and
   a cover forming a user-handle that is manually movable in a linear direction between (1) a position covering the ingredient passage, wherein the cover forming the user-handle closes access to the ingredient passage, and (2) a position uncovering the ingredient passage, wherein the cover is manually slidable from the covering position to the uncovering position and/or vice versa, the cover is associated with an automatic return device for driving the cover from an intermediate position into a stable position selected from the group consisting of the covering position and the uncovering position, and the automatic return device has a first end pivotally mounted on an axis fixed to a face of a housing of the machine and a second end pivotally mounted on an axis fixed to the cover.

18. The machine of claim 17, wherein the automatic return device comprises a pair of arms connected to each other at a point between the first and second ends.

19. A machine for preparing a beverage from at least one ingredient, the machine comprising:
   an ingredient processing module;
   an ingredient passage for inserting an ingredient from outside the machine into the ingredient processing module;
   a cover forming a user-handle that is manually movable between a position covering the ingredient passage and a position uncovering the ingredient passage, the cover is manually slidable from the covering position to the uncovering position and/or vice versa, the cover is associated with a spring arrangement for driving the cover from an intermediate position into a stable position selected from the group consisting of the covering position and the uncovering position; and
   the spring arrangement connecting a pair of arms between (1) a first end pivotally mounted on an axis fixed to a face of a housing of the machine and (2) a second end pivotally mounted on an axis fixed to the cover.

20. The machine of claim 1, wherein the cover comprises more than one support member each fitting a corresponding guiding member of the machine and configured to allow the cover to slide between the covering position and the uncovering position.

* * * * *